United States Patent
Song (10) Patent No.: US 8,862,711 B2
(45) Date of Patent: Oct. 14, 2014

(54) MANAGEMENT SERVER HAVING FUNCTION CONFIRMING STATUS INFORMATION OF DEVICES, METHOD FOR CONFIRMING STATUS INFORMATION OF DEVICES, AND DEVICE AND SYSTEM CAPABLE OF PROVIDING STATUS INFORMATION

(75) Inventor: Won-ho Song, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 754 days.

(21) Appl. No.: 11/733,388

(22) Filed: Apr. 10, 2007

(65) Prior Publication Data

US 2008/0043639 A1 Feb. 21, 2008

(30) Foreign Application Priority Data

Jul. 4, 2006 (KR) .................. 10-2006-0062661

(51) Int. Cl.
G06F 15/173 (2006.01)
(52) U.S. Cl.
USPC ........................................ 709/223; 709/224
(58) Field of Classification Search
USPC .......................... 709/223–226, 244
See application file for complete search history.

(56) References Cited

U.S. PATENT DOCUMENTS

| 6,308,205 | B1 * | 10/2001 | Carcerano et al. ............ 709/221 |
| 6,697,805 | B1 * | 2/2004 | Choquier et al. ............. 707/10 |
| 7,739,362 | B1 * | 6/2010 | Zhang et al. ................. 709/223 |
| 2002/0165915 | A1 * | 11/2002 | Torii ........................ 709/203 |
| 2006/0126111 | A1 | 6/2006 | Song et al. |

FOREIGN PATENT DOCUMENTS

| KR | 10-1999-0001044 | 1/1999 |
| KR | 10-2006-0064984 | 6/2006 |

OTHER PUBLICATIONS

Korean Office Action for Application No. 10-2006-0062661 issued Jun. 29, 2012.

* cited by examiner

*Primary Examiner* — Ebrahim Golabbakhsh
(74) *Attorney, Agent, or Firm* — Stanzione & Kim, LLP (57) ABSTRACT

A management server having a function of confirming status information of devices, a method of confirming status information of devices, and a device capable of providing status information. A first writer writes a status information request list necessary to confirm statuses of devices if the management server is turned on. A first communicator transmits the status information request list to the devices and receives status information response lists from the devices. A first parser parses the status information response lists. A server controller confirms statuses of the devices using parsing results. Thus, a list necessary to confirm statuses of devices can be written in an XML file, parsed, and provided to a manager.

24 Claims, 6 Drawing Sheets

SIZE OF PAPER SHEET
```
-<PaperSize TYPE="COMBOBOX" CONFIG="TRUE"
VISIBLE="TRUE"EDITABLE="TRUE"OPTIONAL="FALSE"
MAXINDEX="15" CURRENT="Auto">
  <Auto STRING="Auto"/>
  <A3 STRING="A3"/>
  <A4 STRING="A4"/>
  <B3 STRING="B3"/>
  <B4 STRING="B4"/>
<PaperSize>
```

PRINTING DIRECTION
```
-<Orientation TYPE="COMBOBOX" CONFIG="TRUE"
VISIBLE="TRUE"EDITABLE="TRUE"OPTIONAL="FALSE"
MAXINDEX="1" CURRENT="Portrait">
  <Landscape STRING="Landscape"/>
  <Portrait STRING="Portrait"/>
</Orientation>
```

NUMBER OF PRINTING SURFACES
```
-<ScanSide>TYPE="COMBOBOX"CONFIG="TRUE"VISIBLE="TRUE"
EDITABLE="TRUE" OPTIONAL="FALSE"MAXINDEX="2"
CURRENT="OneToOne"
  <OneToOne STRING="OneToOne"/>
  <OneToTwo STRING="OneToTwo"/>
  <TwoToTwo STRING="TwoToTwo"/>
</ScanSide>
```

RESOLUTION
```
-<Resolution TYPE="COMBOBOX"CONFIG="TRUE"
VISBLE="TRUE"EDITABLE="TRUE" OPTIONAL="FALSE"
MAXINDEX="7"CURRENT="Res200"
  <Res72 STRING="72"/>
  <Res100 STRING="100"/>
  <Res150 STRING="150"/>
  <Res200 STRING="200"/>
  <Res300 STRING="300"/>
  <Res400 STRING="400"/>
  <Res600 STRING="600"/>
```

MANAGEMENT SERVER HAVING FUNCTION CONFIRMING STATUS INFORMATION OF DEVICES, METHOD FOR CONFIRMING STATUS INFORMATION OF DEVICES, AND DEVICE AND SYSTEM CAPABLE OF PROVIDING STATUS INFORMATION

CROSS-REFERENCE TO RELATED APPLICATIONS

This application claims priority under 35 U.S.C. §119(a) of Korean Patent Application No. 2006-62661 filed on Jul. 4, 2006 in the Korean Intellectual Property Office, the entire disclosure of which is hereby incorporated by reference.

BACKGROUND OF THE INVENTION

1. Field of the Invention

The present general inventive concept relates to a management server having a function of confirming status information of devices, a method of confirming status information of devices, and a device and system capable of providing status information. More particularly, the present general inventive concept relates to a management server having a function of confirming status information of devices belonging to different categories using a workform written in an extensible Markup Language (XML) format, a method of confirming status information of devices, and a device and system capable of providing status information.

2. Description of the Related Art

A network printing system is a system in which a plurality of user terminals share image forming devices, such as a plurality of printers, facsimiles, scanners, copiers, or multi-function peripherals, through an interoffice or home network. A management server manages the image forming devices. The management server confirms and manages a status of each of the image forming devices through a network based on information transmitted from each of the image forming devices.

Figure 1:
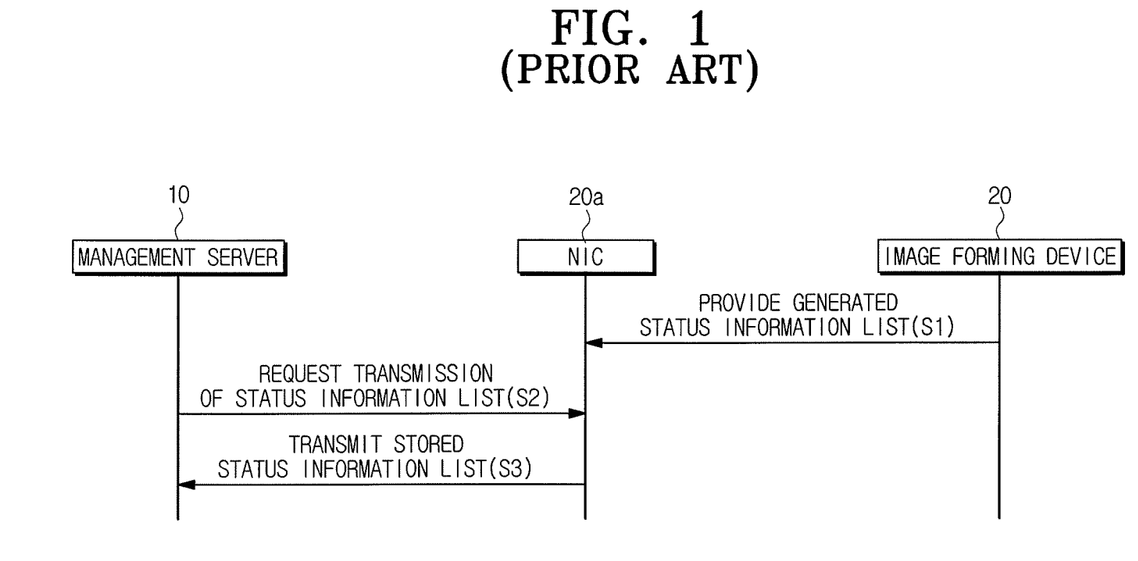
FIG. 1 is a diagram illustrating a sequence of confirming a status of an image forming device using a conventional management server.

FIG. 1 is a diagram illustrating a sequence of confirming a status of an image forming device 20 using a conventional management server 10. Referring to FIG. 1, the conventional management server 10 and the image forming device 20 communicate data with each other using a Simple Network Management Protocol (SNMP) communication method. If the image forming device 20 is turned on to perform its internal operation, the image forming device 20 generates a status information request list of the image forming device 20 and provides the status information request list to a network interface card (NIC) 20*a* in operation S1. The NIC 20*a* stores the status information request list in a memory (not illustrated).

The status information request list includes a plurality of items to confirm a current status of the image forming device 20. For example, the status information request list may include a model name, a serial number, a product version, provided functions, a current resolution, a paper direction, etc. Each of the items of the status information request list is formed as a Management Information Base (MIB) file used in an SNMP network management system.

In operation S2, a manager, who desires to confirm status information of the image forming device 20, is connected to the NIC 20*a* through the management server 10 to request a transmission of the status information request list. In operation S3, the NIC 20*a* transmits the stored status information request list to the management server 10.

The management server 10 confirms the transmitted status information request list to confirm the status information of the image forming device 20 and provides status information confirmed through a web page, a graphic user interface, or other communication link to the manager. Thus, a manager confirms the status information of the image forming device 20, i.e., a specification, a performance, a function, or other information of the image forming device 20.

However, in a method for providing a sequence of confirming the status of the image forming device 20 using the conventional management server 10, whenever a new function or specification is added to the image forming device 20, the manager generates an MIB file corresponding to the added function or specification and stores the generated MIB file in the image forming device 20 and the management server 10. In addition, the manager must revise a firmware and an application program of the image forming device 20 and a firmware of the NIC 20*a* which are related to the added function or specification.

Whenever operation of the image forming device 20 starts, the NIC 20*a* must include a memory to store the status information request list provided from the image forming device 20. Thus, the method is inefficient in terms of cost of the NIC 20*a* and an application of the memory.

SUMMARY OF THE INVENTION

The present general inventive concept provides a management server having a function to confirm status information of devices so as to solve an inconvenience of generating a plurality of Management Information Base (MIB) files whenever statuses of devices are confirmed using a Simple Network Management Protocol (SNMP) communication method or new functions of the devices are added, a method of confirming status information of devices, and a device and system capable of providing status information.

The present general inventive concept provides a management server having a function that confirms status information of devices without storing a status information request list including MIB files so as to reduce additional cost of a network interface card (NIC) caused by a memory and improve an application of the memory of the NIC, a method of confirming status information of devices, and a device and system capable of providing status information.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing a management server to confirm status information of devices in a network, including a first writer to write a status information request list if the management server is turned on, a first communicator to transmit the status information request list to devices and to receive status information response lists from the devices, a first parser to parse the status information response lists, and a server controller to confirm statuses of the devices using parsing results.

The status information request list may include a plurality of items, and the devices respond to whether the plurality of items are executable, and each of the plurality of items has sub items.

The first writer may write the status information request list including the plurality of items necessary to confirm standards, functions, performances, and specifications of the devices as the statuses of the devices.

The status information request list and the status information response lists may be written in an XML (extensible Markup Language) format.

If the devices connected to the first communicator to communicate with the first communicator are detected, the server controller may control the first communicator to transmit the status information request list to detected devices.

Each of the devices may be an image forming device, a home appliance, or a communication device which is connected to the first communicator to communicate with the first communicator.

Each of the devices may include a second communicator to receive the status information request list from the first communicator, a second parser to parse the status information request list, a second writer to write the status information response list, according to the parsed status information request list, and a device controller to control the second communicator to transmit the status information response list to the first communicator.

The foregoing and/or other aspects of the present general inventive concept may also be achieved by providing a method of confirming status information of devices in a network, including if a management server is turned on, writing a status information request list, transmitting the status information request list to devices, receiving status information response lists from the devices, parsing the status information response lists, and confirming statuses of the devices using parsing results.

The writing of the status information request list may include writing the plurality of items necessary to confirm standards, functions, performances, and specifications of the devices as the status information request list.

The transmitting of the status information request list may include transmitting the status information request list when the devices connected to a first communicator to communicate with the first communicator are detected.

The method may further include parsing the status information request list through the devices, writing the status information response lists according to the parsed status information request list through the devices, and transmitting the status information response lists.

The foregoing and/or other aspects of the present general inventive concept may also be achieved by providing a device capable of providing status information in a network, including a communicator to receive a status information request list necessary to confirm an internal status from a management server, a parser to parse the status information request list, a device controller to confirm the internal status and then respond to the status information request list using parsing results, and a writer to write a status information response list as a response to the status information request list, wherein the device controller controls the communicator to transmit the status information response list to the management server.

The foregoing and/or other aspects of the present general inventive concept may also be achieved by providing a network system to confirm status information of devices, including a management server to write a status information request list necessary if the management server is turned on, to transmit the status information request list and to receive a status information response list, to parse the status information response list, and to confirm statuses of the devices using the parsing results, and a device connected to the management server through a communication network to receive the status information list, to parse the status information request list, to confirm internal status and then to respond to the status information request list using the parsing results, to write the status information response list as a response to the status information request list, and to transmit the status information response list to the management server.

The foregoing and/or other aspects of the present general inventive concept may also be achieved by providing a network system to confirm status information of devices, including a management server to write a status information request list according to a power-on state, to transmit the status information request list to devices, to receive one or more status request response lists from the devices, and to confirm status of the devices according to the status information response lists.

The foregoing and/or other aspects of the present general inventive concept may also be achieved by providing a management server to manage status information of devices in a network, including a communicator to transmit a status information request to the devices and to receive status information responses from the devices, and a server controller to confirm statuses of the devices and to respond to the status information request from the communicator with a status information response through a data transmission path, wherein the server controller controls the communicator to transmit the status information request to and to receive the status information responses from the devices using an eXtensible Markup Language (XML) format.

The foregoing and/or other aspects of the present general inventive concept may also be achieved by providing a computer-readable recording medium having embodied thereon a computer program to execute a method of confirming status information of device in a network, the method including if a management server is turned on, writing a status information request list, transmitting the status information request list to devices, receiving status information response lists from the devices, parsing the status information response lists, and confirming statuses of the devices using the parsing result.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 3 is a view illustrating a part of a status information request list written in an extensible Markup Language (XML) format in a first writer of the management server illustrated in FIG. 2, according to an embodiment of the present general inventive concept;

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
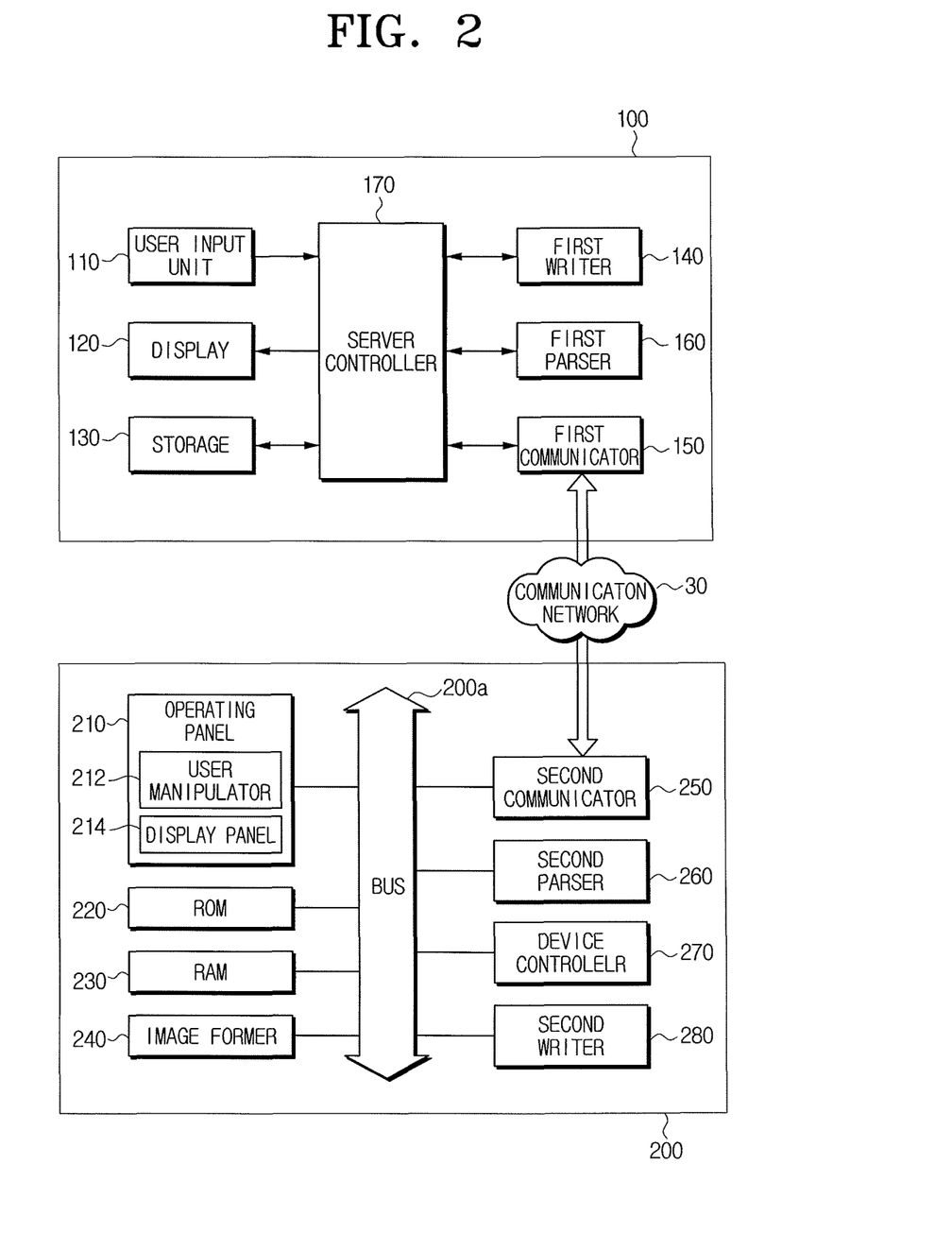
FIG. 2 is a block diagram illustrating a management server having a function of confirming status information of a device connected to the management server, according to an embodiment of the present general inventive concept.

FIG. 2 is a block diagram illustrating a management server 100 having a function that confirms status information of a device 200 connected to the management server 100, according to an embodiment of the present general inventive concept. Referring to FIG. 2, the management server 100 according to the present embodiment remotely diagnoses the device 200 and is connected to the device 200 through a communication network 30. The management server 100 may be connected to a plurality of devices but is connected to only the device 200 in the present embodiment.

The management server 100 manages the device 200 in consideration of information related to a status of the device 200 such as performance, function, and specification of the device 200. The device 200 is a device in which a program necessary to communicate with the management server 100 is installed and may be one of various electronic devices belonging to different categories such as an image forming device, a communication device, a home appliance, and/or other devices.

Here, the image forming device refers to a printer that prints data transmitted from a host computer, a facsimile that transmits a fax, a scanner that performs scanning, a copier that performs coping, a multifunction peripheral having multiple functions of printer, facsimile, scanner, and copier, or other various devices.

The communication device refers to a device to perform communications through the communication network 30 such as a cellular phone, a personal communication service (PCS) phone, a personal digital assistant (PDA), a personal computer (PC), or the like. The home appliance refers to an electronic product used in a home or office such as a digital television (TV), a refrigerator, an air conditioner, or the like.

The communication network 30 may be established by a cable connected to a general parallel port, a cable connected to a universal serial bus (USB) port, an Internet network established by a hub and a local area network (LAN), or the like.

Hereinafter, the management server 100 will be described as a host computer in which a program necessary to manage the device 200 is installed, and the device 200 will be described as an image forming device.

The management server 100 according to the present embodiment includes a user input unit 110, a display 120, a storage 130, a first writer 140, a first communicator 150, a first parser 160, and a server controller 170. Blocks of the management server 100 unrelated to the present general inventive concept will be omitted herein.

The user input unit 110 is a user interface, such as a keyboard or a mouse, and outputs a signal to select and request a function supported by the management server 100. A user may request an execution of a management program stored in the storage 130 and then a collection of status information of the device 200 through the user input unit 110.

The display 120 displays a screen corresponding to a signal provided from the server controller 170 or an operation status of the management server 100. The display 120 also displays a status information screen generated by the server controller 170. The status information screen will be described in detail later. The display 120 may be realized as a liquid crystal display (LCD), a cathode ray tube (CRT), or the like but is not limited thereto. The display 120 may be realized as one of many types of displayable devices.

The storage 130 stores various control programs necessary to realize the function of the management server 100, Windows-based operating systems, the management program necessary to confirm the status information of the device 200, a program necessary to write the status information request list, a program necessary to parse a status information response list, and various types of data generated during operation of the management server 100. For example, the storage 130 may be realized as a hard disk drive.

Figure 6:
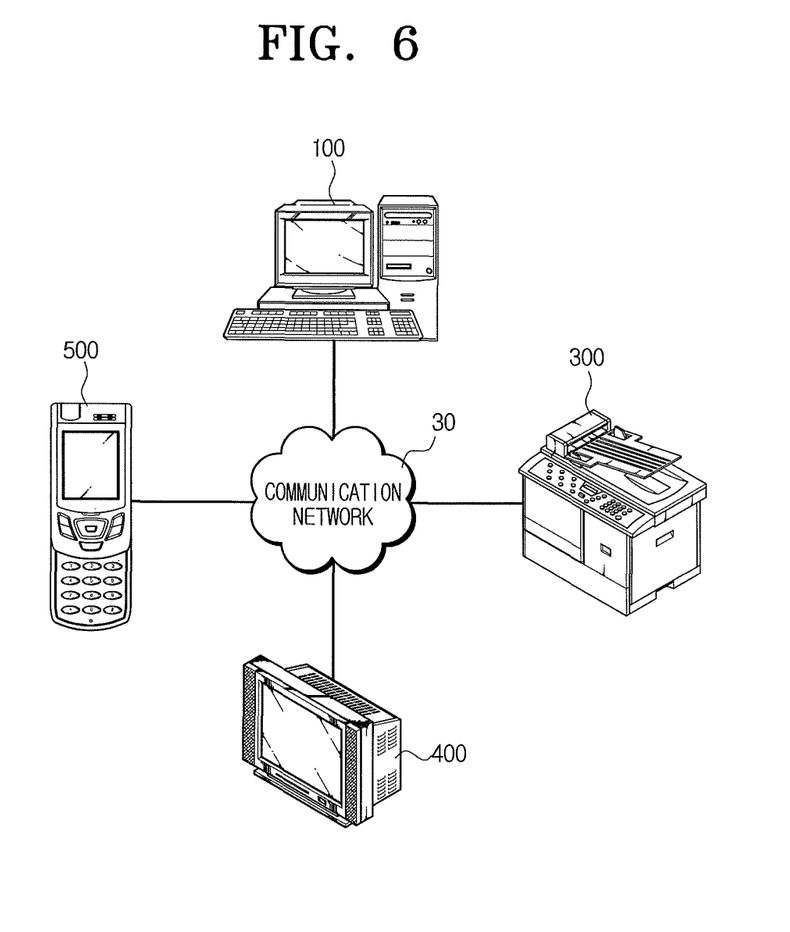
FIG. 6 is a view illustrating a web management system to confirm status information of a plurality of devices using the management server illustrated in FIG. 2, according to an embodiment of the present general inventive concept.

The storage 130 also stores a plurality of items necessary to write the status information request list. The status information request list includes a plurality of items necessary to confirm status information of all devices (refer to FIG. 6 illustrating devices 300, 400, and 500) connected through the communication network 30. In other words, the status information request list is a kind of workform. The status information represents responses to the plurality of items necessary to confirm functions, performances, specifications, and standards of the devices. Here, the plurality of items of the status information request list include items related to all devices (refer to FIG. 6) registered in the management server 100.

If the management server 100 is turned on, the first writer 140 writes the status information request list using the plurality of items stored in the storage 130. For example, the first writer 140 writes the status information request list as a file using an XML (extensible Markup Language (XML) format web language.

If the status information request list is transmitted to all of the devices connected to the management server 100 through the communication network 30, the devices respond to each of the items or each of sub items, write status information response lists including responses, and transmit the status information response lists to the management server 100. The status information response lists transmitted from the devices connected to the management server 100 to communicate with the management server 100 are stored in the storage 130 separately for each of the devices.

FIG. 3 is a view illustrating a part of the status information request list written in the XML format by the first writer 140 of the management server 100 illustrated in FIG. 2, according to an embodiment of the present general inventive concept. Referring to FIG. 3, the status information request list is written in the XML format and includes the plurality of items necessary to confirm status of the device 200. Here, each of the plurality of items includes a plurality of sub items. For example, the plurality of items include a size of a paper sheet on which an image is to be formed, a printing direction, a number of printing surfaces, a resolution, etc. The size of the paper sheet includes sub items such as "A3," "A4," "BC," "B4," etc. The printing direction includes sub items such as a landscape, a portrait, etc. The number of printing surfaces includes sub items such a one-to-one page, a one-to-two page, etc. The resolution includes sub items such as "100 dpi," "150 dpi," "200 dpi," "300 dpi," "400 dpi," "600 dpi," etc. The plurality of items and the sub items of each of the plurality of items are written as a file.

Referring to FIG. 2 again, the first communicator 150 transmits the status information request list written in the XML format to the device 200 through the communication network 30. The first communicator 150 receives the status information response list from the device 200 and outputs the status information response list to the first parser 160. The status information response list is written in an XML format by the device 200 and includes responses to the items and the sub items of the status information request list. For example, the first communicator 150 may be a network interface card (NIC).

The first parser 160 parses the status information response list provided form the first communicator 150 and generates parsing results. In other words, the first parser 160 parses a response to each of the items of the status information request list.

The server controller 170 controls an overall operation of the management server 100 using pre-stored various control programs. If execution of the management program is requested from the user input unit 110, the server controller 170 executes the management program stored in the storage 130.

In particular, if the management server 100 is turned on, the server controller 170 controls the first writer 140 to write the status information request list using the plurality of items stored in the storage 130. The server controller 170 also controls the first communicator 150 to detect the devices connected to the management server 100 through the communication network 30. If the connected devices are detected by the first communicator 150, the server controller 170 controls the first communicator 150 to transmit the status information request list to the device 200.

The server controller 170 also confirms status information of the device 200 based on the parsing results of the first parser 160. For example, if "100/150/200/300/400 dpi" are "true," and "600 dpi" is "false" as response results of the resolution of the status information request list, the server controller 170 determines that the device 200 supports the resolutions of "100/150/200/300/400 dpi" but does not support resolutions more than "100/150/200/300/400 dpi".

Also, the server controller 170 generates a status information screen corresponding to the confirmed status of the device 200 and displays the status information screen on the display 120. The status information screen is a user interface screen that displays the responses to the items and graphically generates the responses with an image, a graph, a text, etc. The manager may easily confirm a current status of the device 200 through the status information screen displayed on the display 120.

The device 200 according to the embodiment of the present general inventive concept includes an operating panel 210, a read only memory (ROM) 220, a random access memory (RAM) 230, an image former 240, a second communicator 250, a second parser 260, a device controller 270, and a second writer 280. A bus 200a is a data transmission path connecting the respective function blocks 210, 220, 230, 240, 250, 260, 270, 280.

The operating panel 210 includes a user manipulator 212 and a display panel 214. The user manipulator 212 outputs signals to manipulate functions supported by the device 200 to the device controller 270 and includes various keys and a touch screen.

The display panel 214 is controlled by the device controller 270 to display a workflow status of the device 200 using predetermined letters, patterns, images, etc. The display panel 214 may be generally realized as an LCD.

The ROM 220 stores various control programs necessary to realize the functions of the device 200, a program necessary to parse the status information request list, and a program necessary to parse the status information response list. The RAM 230 stores various types of data generated during the operation of the device 200.

The image former 240 generates image data of a document and performs work related to the image data. For example, if the image former 240 includes a scanner (not illustrated), a printing engine (not illustrated), and a modem (not illustrated), the image former 240 may scan the document, print the document on a paper sheet, or perform a copying or faxing function.

The second communicator 250 is connected to the management server 100 through the communication network 30 to communicate with the management server 100 and supports interfaces between the device 200 and other devices (not illustrated). For this purpose, the second communicator 250 may be realized as an NIC. For example, the device 200 may e-mail a scanned image to another device (not illustrated) through the second communicator 250 or transmit the scanned image to the another device using a File Transfer Protocol (FTP).

The second communicator 250 receives the status information request list having the XML format from the management server 100 and outputs the status information request list to the second parser 260. The second communicator 250 also transmits the status information response list written by a second writer 280 to the management server 100. The status information response list includes responses to the plurality of items of the status information request list.

The second parser 260 parses the status information request list received from the second communicator 250 and outputs the parsing results to the device controller 270. The parsing results of the status information request list includes the plurality of items necessary for confirming status of the device 200.

The device controller 270 controls an overall operation of the device 200 according to various control programs stored in the ROM 220. The device controller 270 confirms and/or checks the status of the device 200 based on the plurality of items obtained from the parsing results of the status information request list to respond to the plurality of items and the plurality of sub items of each of the plurality of items.

The second writer 280 writes a list (referred to as the status information response list) including the responses to the items or the sub items in the XML format. The written status information response list is transmitted to the management server 100 through the second communicator 250 under control of the device controller 270.

Figure 4:
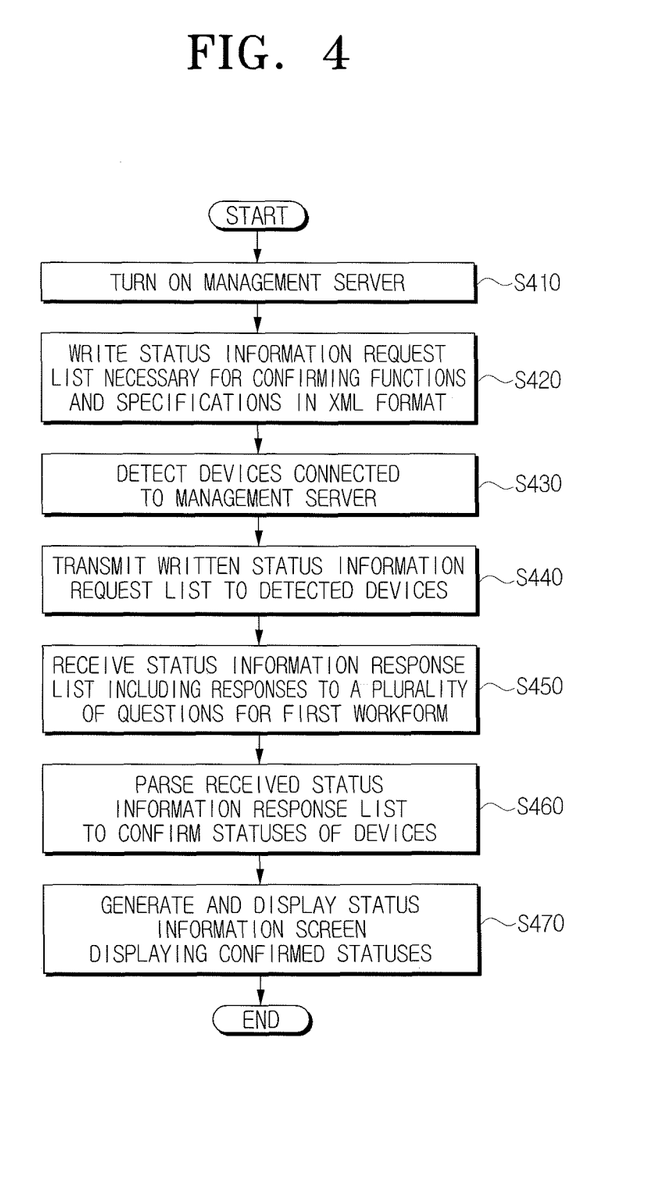
FIG. 4 is a flowchart illustrating a method of remote diagnosing a device using the management server illustrated in FIG. 2, according to an embodiment of the present general inventive concept.

FIG. 4 is a flowchart illustrating a method of confirming the status information of the device 200 using the management server 100 illustrated in FIG. 2, according to an embodiment of the present general inventive concept. Referring to FIGS. 2 through 4, in operation S410, the management server 100 is turned on. In operation S420, the server controller 170 controls the first writer 140 to write a status information request list as shown in FIG. 3 in an XML format using a plurality of items stored in the storage 130.

In operation S430, the server controller 170 controls the first communicator 150 to detect devices (refer to FIG. 6) connected to the management server 100 through the communication network 30. In operation S440, the server controller 170 controls the first communicator 150 to transmit the status information request list to the device 200.

In operation S450, a status information response list including responses to the plurality of items of the status information request list is received from the device 200. In operation S460, the server controller 170 controls the first parser 160 to parse the status information response list and confirms a current state of the device 200 based on the parsing results.

In operation S470, the server controller 170 generates a status information screen which displays a confirmed current status of the device 200 and displays the status information screen on the display 120. Thus, a manager may confirm a current state of the device 200 through the status information screen displayed on the display 120. In other words, a user may easily confirm statuses related to the device 200 such as a function, a set performance, and/or a specification of the device 200 connected to the management server 100.

Figure 5:
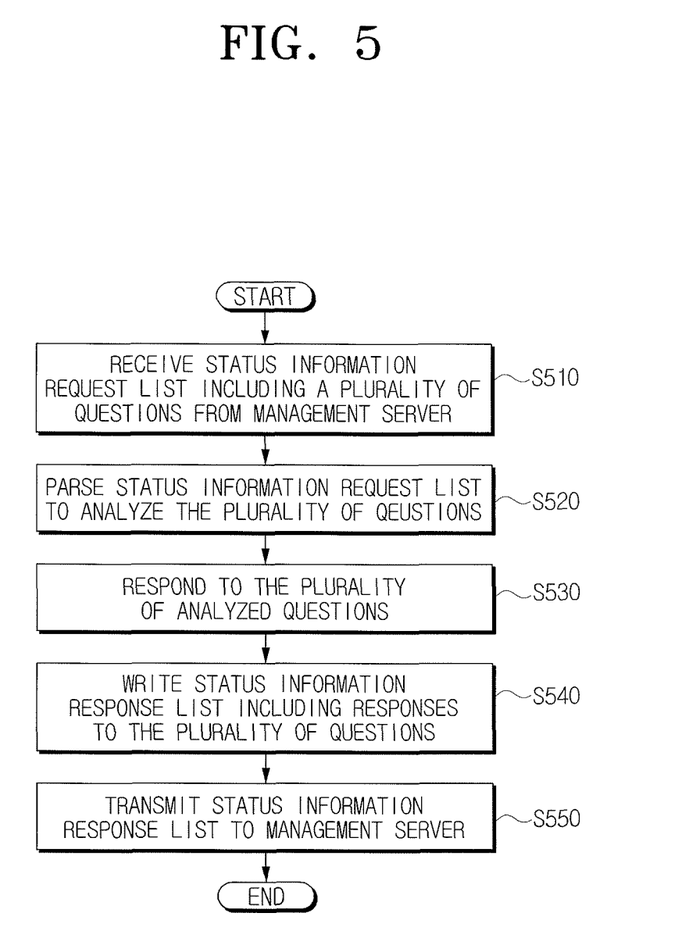
FIG. 5 is a flowchart illustrating a method of responding to a status information request list through the device illustrated in FIG. 2 and transmitting response results to the management server according to an embodiment of the present general inventive concept.

FIG. 5 is a flowchart illustrating a method of responding to the status information request list through the device 200 illustrated in FIG. 2 and transmitting response results to the management server 100, according to an embodiment of the present general inventive concept. Referring to FIGS. 2 through 5, in operation S510, the second communicator 250 receives the status information request list including the plurality of items transmitted in operation S440. In operation S520, the device controller 270 controls the second parser 260 to parse the status information request list to obtain and analyze the plurality of items.

In operation S530, the device controller 270 responds to the analyzed plurality of items based on the parsing results of the status information request list. In other words, the device controller 270 confirms and/or checks a status of the device 200 based on each of the items to respond to the plurality of items.

If the status information request list as illustrated in FIG. 3 is parsed, the device controller 270 responds to a resolution, a paper sheet printing direction, a number of printing surfaces, and/or other attributes which can be supported by the device 200. Here, the device controller 270 may respond to each of sub items as "false" or "true." For example, if the device 200 is able to support only a resolution of 100 dpi, the second writer 280 outputs "true" as a response to the resolution of 100 dpi and "false" as responses to other resolutions.

In operation S540, the device controller 270 controls the second writer 280 to write a status information response list including responses to the items in an XML format.

In operation S550, the device controller 270 controls the second communicator 250 to transmit the status information response list to the management server 100.

It has been described in the embodiment of the present general inventive concept with reference to FIGS. 2 through 5 that the device 200 is connected to the management server 100. However, a number of devices (refer to FIG. 6) confirmed by the management server 100 is not limited to one, and multiple devices connected to the management server 100 may be confirmed.

FIG. 6 is a view illustrating a web management system confirming status information of a plurality of devices using the management server 100 illustrated in FIG. 2, according to an embodiment of the present general inventive concept. Referring to FIGS. 2 through 6, the management server 100 is connected to a multifunction peripheral 300, a digital TV 400, and a cellular phone 500 through the communication network 30 to communicate with the multifunction peripheral 300, the digital TV 400, and the cellular phone 500. If the management server 100 is turned on, the management server 100 writes a status information request list necessary to confirm statuses of the devices. The management server 100 also detects all of the devices connected thereto and transmits the status information request list to each of the detected devices.

If the management server 100 determines that the multifunction peripheral 300, the digital TV 400, and the cellular phone 500 are connected to the management server 100 as illustrated in FIG. 6, the management server 100 transmits the status information request list to the multifunction peripheral 300, the digital TV 400, and the cellular phone 500. Here, the status information request list including a plurality of items necessary to confirm statuses of the multifunction peripheral 300, the digital TV 400, and the cellular phone 500 is written as a file.

The multifunction peripheral 300, the digital TV 400, and the cellular phone 500 respond to supportable items as "true" and to insupportable items as "false", write status information response lists including responses to the items, and transmit the status information request lists to the management server 100. For this purpose, the multifunction peripheral 300, the digital TV 400, and the cellular phone 500 include parsers to parse the status information request list, and programs and workform writers to write the status information response lists.

The management server 100 parses the status information response lists transmitted from the multifunction peripheral 300, the digital TV 400, and the cellular phone 500 to confirm status information of the multifunction peripheral 300, the digital TV 400, and the cellular phone 500. The management server 100 generates and displays a user interface screen which displays status information of the multifunction peripheral 300, the digital TV 400, and the cellular phone 500.

The status information request list described with reference to FIG. 2 may be written even if a user intentionally requests a confirmation of status information. In other words, if the user requests a confirmation of a status of the device 200 on a user interface screen provided by a management program using the user input unit 110 after the management program stored in the storage 130 is executed by a request of the user, the first writer 140 writes a status information request list necessary to confirm status information of the device 200 connected through the communication network 30.

As described above, in a management server having a function which confirms status information of a plurality of devices, a method of confirming status information of devices, and a device capable of providing status information according to the present general inventive concept, a plurality of items necessary to confirm a current status of a device can be written as a file in an XML format. Thus, an inconvenience of generating an MIB for each of the items can be solved.

Also, if the confirmation of the status information using the XML format is applied to all of the devices, standardization and common use can be achieved. In other words, parsing and analyzing of the status information request list written in the XML format can be applied to all of the devices. If all of the devices are designed so as to write status information response lists including responses to the status information request list, a manager can easily confirm functions, performances, and specifications of all of the devices registered in the management server. Also, the confirmation of the status information is not limited to devices belonging to the same category but can be applied to devices belonging to all categories.

In addition, whenever the device starts operating, the status information request list including MIB files do not need to be stored in an NIC. Thus, an application of a memory of the NIC can be improved.

The present general inventive concept can also be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains. The methods illustrated in FIGS. 4 and 5 can be stored in the computer-recorded medium in a form of computer-readable codes to perform the method when the computer reads the computer-readable codes of the recording medium.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A management server to confirm status information of a plurality of devices in a network, comprising:
    a first writer to write a status information request list having a plurality of items to confirm the status of the plurality of devices if the management server is turned on;
    a first communicator to transmit the status information request list to the plurality of devices and to receive status information response lists corresponding to the respective items of the status information request list from the devices;
    a first parser to parse the status information response lists; and
    a server controller to confirm statuses of the devices using the parsing results,
    wherein the first writer writes the status information request list as a file in the form of a workform using an eXtensible Markup Language (XML) format web language,
    wherein at least one device of the plurality of devices responds logical true to an item in the respective status information response list of the device which can be supported by the device and responds logical false to an item in the respective status information response list of the device which cannot be supported by the device,
    wherein each of the devices is an image forming device, and
    wherein the status information request list comprises a plurality of items necessary to confirm standards, functions, performances, and specifications of the devices.

2. The management server of claim 1, wherein the devices respond to whether the plurality of items are executable, and each of the plurality of items comprises sub items.

3. The management server of claim 1, wherein the first writer writes the status information request list comprising the plurality of items necessary to confirm standards, functions, performances, and specifications of the devices as the statuses of the devices.

4. The management server of claim 1, wherein the status information request list and the status information response lists are written in an XML (eXtensible Markup Language) format.

5. The management server of claim 1, wherein if the devices connected to the first communicator to communicate with the first communicator are detected, the server controller controls the first communicator to transmit the status information request list to the detected devices.

6. The management server of claim 1, wherein each of the devices comprises:
    a second communicator to receive the status information request list from the first communicator;
    a second parser to parse the status information request list;
    a second writer to write the status information response list according to the parsed status information request list; and
    a device controller to control the second communicator to transmit the status information response list to the first communicator.

7. A method of confirming status information of devices in a network, comprising:
    if a management server is turned on, writing a status information request list having a plurality of items to confirm the status of the devices with a writer device;
    transmitting the status information request list to the devices;
    receiving status information response lists corresponding to the respective items of the status information request list from the devices;
    parsing the status information response lists; and
    confirming statuses of the devices using the parsing results,
    wherein the writing of the status information request list comprises writing the status information request list as a file in the form of a workform using an eXtensible Markup Language (XML) format web language,
    wherein at least one device of the devices responds logical true to an item in the respective status information response list of the device which can be supported by the device and responds logical false to an item in the respective status information response list of the device which cannot be supported by the device,
    wherein each of the devices is an image forming device, and
    wherein the status information request list comprises a plurality of items necessary to confirm standards, functions, performances, and specifications of the devices.

8. The method of claim 7, wherein the devices respond to whether the plurality of items are executable, and each of the plurality of items comprises sub items.

9. The method of claim 7, wherein the status information request list and the status information response lists are written in an XML format.

10. The method of claim 7, wherein the transmitting of the status information request list comprises transmitting the status information request list when the devices connected to a first communicator to communicate with the first communicator are detected.

11. The method of claim 7, further comprising:
    parsing the status information request list through the devices;
    writing the status information response lists according to the parsed status information request list through the devices, and
    transmitting the status information response lists.

12. A device capable of providing status information in a network, comprising:
    a communicator to receive a status information request list having a plurality of items necessary to confirm an internal status of a plurality of devices from a management server;
    a parser to parse the status information request list;
    a device controller to confirm the internal status and then to respond to the status information request list using the parsing results; and a writer to write a status information response list corresponding to the respective items of the status information request list as a response to the status information request list, wherein the device controller controls the communicator to transmit the status information response list to the management server, wherein the status information request list is written as a file in the form of a workform using an eXtensible Markup Language (XML) format web language, wherein the device responds logical true to an item in the status information response list which can be supported by the device and responds logical false to an item in the status information response list which cannot be supported by the device, wherein the device is an image forming device, and wherein the status information request list comprises a plurality of items necessary to confirm standards, functions, performances, and specifications of the devices.

13. The device of claim 12, wherein the status information request list and the status information response list are written in an XML format.

14. A network system to confirm status information of devices, comprising:

a management server to write a status information request list having a plurality of items necessary to confirm status information of the devices if the management server is turned on, to transmit the status information request list to the devices and to receive a status information response list, to parse the status information response list, and to confirm statuses of the devices using the parsing results; and a device connected to the management server through a communication network to receive the status information request list, to parse the status information request list, to confirm internal status and then to respond to the status information request list using the parsing results, to write the status information response list corresponding to the respective items of the status information request list as a response to the status information request list, and to transmit the status information response list to the management server, wherein the management server writes the status information request list as a file in the form of a workform using an eXtensible Markup Language (XML) format web language, wherein at least one of the devices responds logical true to an item in the respective status information response list of the device which can be supported by the device and responds logical false to an item in the respective status information response list of the device which cannot be supported by the device, wherein the device is an image forming device, and wherein the status information request list comprises a plurality of items necessary to confirm standards, functions, performances, and specifications of the devices.

15. The network system of claim 14, wherein the communication network comprises a USB port, a parallel port, an Internet, or a local area network (LAN).

16. The network system of claim 14, further comprising:

a network interface card (NIC) connected between the management server and the device, wherein the NIC does not store the status information request list using management information base (MIB) files.

17. A network system to confirm status information of devices, comprising:

a management server to write a status information request list having a plurality of items to confirm status information of each of the devices according to a power-on state, to transmit the status information request list to the devices, to receive one or more status request response lists responding to the respective items of the status information request list from the devices, and to confirm status of the devices according to the status information response lists, wherein the management server writes the status information request list as a file in the form of a workform using an eXtensible Markup Language (XML) format web language, wherein at least one device responds logical true to an item in the respective status information response list which can be supported by the device and responds logical false to an item in the respective status information response list which cannot be supported by the device, wherein each of the devices is an image forming device, and wherein the status information request list comprises a plurality of items necessary to confirm standards, functions, performances, and specifications of the devices.

18. A management server to manage status information of devices in a network, comprising:

a communicator to transmit a status information request having a plurality of items to confirm status information of the devices to the devices and to receive status information responses responsive to each of the respective items of the status information request from the devices; and a server controller to confirm statuses of the devices according to the status information response received from the communicator through a data transmission path, wherein the server controller controls the communicator to transmit the status information request to and to receive the status information responses from the devices using an eXtensible Markup Language (XML) format, wherein the status information request is written as a file in the form of a workform using an XML format, wherein at least one of the devices responds logical true to an item in the respective status information response which can be supported by the device and responds logical false to an item in the respective status information response which cannot be supported by the device, wherein each of the devices is an image forming device, and wherein the status information request list comprises a plurality of items necessary to confirm standards, functions, performances, and specifications of the device.

19. The management server of claim 18, wherein the data transmission path comprises a bus.

20. The management server of claim 18, wherein the communicator comprises a network interface card (NIC).

21. The management server of claim 18, wherein the communicator transmits the image data using a simple network management protocol (SNMP).

22. The management server of claim 18, wherein the status information request comprises a model name, a serial number, a product version, provided functions, and/or a device attribute.

23. The management server of claim 18, further comprising:

a writer to write the status information request; and a parser to parse the status information response.

24. A non-transitory computer-readable recording medium having embodied thereon a computer program to execute a method of confirming status information of a device in a network, the method comprising:
- if a management server is turned on, writing a status information request list having a plurality of items to confirm the status of the devices with a writing device;
- transmitting the status information request list to the devices;
- receiving status information response lists corresponding to the respective items of the status information request list from the devices;
- parsing the status information response lists; and
- confirming statuses of the devices using the parsing results,
- wherein the writing of the status information request list comprises writing the status information request list as a file in the form of a workform using an eXtensible Markup Language (XML) format web language,
- wherein at least one device responds logical true to an item in the respective status information response list which can be supported by the device and responds logical false to an item in the respective status information response list which cannot be supported by the device,
- wherein the device is an image forming device, and
- wherein the status information request list comprises a plurality of items necessary to confirm standards, functions, performances, and specifications of the devices.

* * * * *